United States Patent
Lee

(10) Patent No.: US 9,970,777 B2
(45) Date of Patent: May 15, 2018

(54) METHOD AND APPARATUS FOR RECOMMENDING EXERCISE ROUTES

(71) Applicant: Samsung Electronics Co., Ltd., Suwon-si (KR)

(72) Inventor: Sun Jae Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/625,054

(22) Filed: Feb. 18, 2015

(65) Prior Publication Data

US 2015/0238815 A1  Aug. 27, 2015

(30) Foreign Application Priority Data

Feb. 26, 2014 (KR) .................. 10-2014-0022846

(51) Int. Cl.
*G01C 21/34* (2006.01)

(52) U.S. Cl.
CPC .................. *G01C 21/343* (2013.01)

(58) Field of Classification Search
CPC .............. G01C 21/343; G01C 21/3423; G01C 21/3484; G01C 21/20; A61B 5/1118; G06F 19/3481
See application file for complete search history.

(56) References Cited

U.S. PATENT DOCUMENTS

| | | | |
|---|---|---|---|
| 8,690,578 B1* | 4/2014 | Nusbaum | G09B 19/00 |
| | | | 128/905 |
| 9,280,640 B2* | 3/2016 | Nusbaum | |
| 9,389,086 B2* | 7/2016 | Hashem | G01C 21/20 |
| 2004/0131227 A1* | 7/2004 | Bravomalo | G06Q 30/0269 |
| | | | 382/100 |
| 2007/0032344 A1* | 2/2007 | Guo | 482/8 |
| 2007/0156335 A1* | 7/2007 | McBride | G01C 21/20 |
| | | | 701/533 |
| 2008/0050740 A1* | 2/2008 | Cassidy | C12Q 1/6876 |
| | | | 435/6.16 |

(Continued)

FOREIGN PATENT DOCUMENTS

| | | |
|---|---|---|
| JP | 10-148539 A | 6/1998 |
| JP | 2004-109100 A | 4/2004 |

(Continued)

*Primary Examiner* — John Olszewski
*Assistant Examiner* — Thomas E Worden
(74) *Attorney, Agent, or Firm* — NSIP Law

(57) ABSTRACT

An apparatus and method for recommending exercise routes are provided. The apparatus for recommending an exercise route includes a reference point receiver configured to receive at least two reference points that are displayable on a map based on map information, an exercise route generator configured to generate at least one geographical route between the reference points based on the map information, and generate a plurality of exercise routes by associating at least one type of exercise with the at least one geographical route with reference to exercise information comprising exercise amount data, exercise type data, and health care data, and a map generator configured to generate a map on which the plurality of exercise routes are presented together with expected amounts of calories expended on the respective exercise routes.

22 Claims, 13 Drawing Sheets

(56) References Cited

U.S. PATENT DOCUMENTS

| | | | | |
|---|---|---|---|---|
| 2010/0305852 A1* | 12/2010 | Eger | .................... | G01C 21/343 701/533 |
| 2011/0250937 A1* | 10/2011 | Hubbard | .............. | A61B 5/0002 463/6 |
| 2012/0143497 A1* | 6/2012 | Van Hende | ........ | G01C 21/3484 701/432 |
| 2012/0150074 A1* | 6/2012 | Yanev | ................. | A43B 3/0005 600/587 |
| 2013/0263719 A1* | 10/2013 | Watterson | ................ | G10H 1/42 84/609 |
| 2013/0268101 A1* | 10/2013 | Brammer | ........... | A63B 24/0062 700/91 |
| 2013/0297201 A1* | 11/2013 | Van Hende | ........ | G01C 21/3407 701/425 |
| 2013/0304377 A1* | 11/2013 | Van Hende | ........... | G01C 21/20 701/533 |
| 2014/0278064 A1* | 9/2014 | Lee | ........................ | G01C 21/34 701/428 |
| 2014/0371887 A1* | 12/2014 | Hoffman | ............ | G06K 9/00342 700/91 |
| 2015/0276419 A1* | 10/2015 | Hashem | ................. | G01C 21/20 701/425 |
| 2016/0088284 A1* | 3/2016 | Sareen | ................... | G06N 3/006 348/47 |
| 2016/0171905 A1* | 6/2016 | Nusbaum | ............... | G09B 19/00 434/127 |
| 2016/0247017 A1* | 8/2016 | Sareen | ................... | G06T 7/593 |
| 2016/0263435 A1* | 9/2016 | Venkatraman et al. | ......................... | A63B 24/0021 |

FOREIGN PATENT DOCUMENTS

| | | |
|---|---|---|
| KR | 2001-0094099 A | 10/2001 |
| KR | 2003-0006670 A | 1/2003 |
| KR | 2003-0068788 A | 8/2003 |

* cited by examiner

METHOD AND APPARATUS FOR RECOMMENDING EXERCISE ROUTES

CROSS-REFERENCE TO RELATED APPLICATION(S)

This application claims the benefit under 35 USC 119(a) of Korean Patent Application No. 10-2014-0022846 filed on Feb. 26, 2014, in the Korean Intellectual Property Office, the entire disclosure of which is incorporated herein by reference for all purposes.

BACKGROUND

1. Field

The following description relates to an exercise route recommendation technology, and to a technology for recommending exercise routes that allow a user to perform exercise while moving from one geographic location to another.

2. Description of Related Art

High-performance mobile computing devices, such as smart watches, smartphones, tablet PCs, and the like, are being widely used. These mobile devices may be equipped with various sensors such as a global positioning system, an accelerometer, a geomagnetic sensor, a gyroscope, and the like. Thus, when a user wearing or holding such a mobile device moves around, the user's movement and moving speed may be detected by sensors within the mobile device. Accordingly, by using the data detected by sensors within the mobile devices, it is possible to estimate an amount of calories expended during an exercise, such as walking or running. Thus, health care applications that provide information for diet or manage an amount of exercise using the sensor data stored in the mobile device have been introduced.

The health care applications executed on mobile devices may include tutorial applications to inform of a type of exercise that is appropriate for a user, exercise measurement applications to calculate an amount of calories burnt on an exercise based on a detected travel distance and show the calculation result as a diagram or a graph, and calorie counting applications to keep a food intake record for controlling a diet. From among a variety of applications, a user may be able to select and use an appropriate health care application. However, the existing health care applications may simply recommend a particular type of exercise in terms of the amount of exercise, rather than recommending a more appropriate type of exercise for the user based on various situations that the user may encounter. Thus, the conventional health care applications are limited to specific types of exercises, such as moving on foot or by bicycle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for recommending an exercise route, including: a reference point receiver configured to receive at least two reference points that are displayable on a map based on map information; an exercise route generator configured to generate at least one geographical route between the reference points based on the map information, and generate a plurality of exercise routes by associating at least one type of exercise with the at least one geographical route with reference to exercise information comprising exercise amount data, exercise type data, and health care data; and a map generator configured to generate a map on which the plurality of exercise routes are presented together with expected amounts of calories expended on the respective exercise routes.

The general aspect of the apparatus may further include a display configured to display the map generated by the map generator, and an input device configured to receive a selected route among the plurality of exercise routes from a user.

The exercise information may be generated based on information manually input by a user or based on an expected amount of calories expended that is calculated from movements of the user identified from sensing information obtained by a sensor.

The exercise type data may include at least one of the following activities: being inactive, walking, running, and user-powered transport. The being inactive may correspond to not moving or moving by transportation equipment powered by a source other than a user's physical strength. The walking and running may correspond to an activity of moving by foot. The user-powered transport may correspond to an activity of moving by a transportation powered by a user's physical strength.

The exercise route generator may be configured to generate the plurality of exercise routes to be different from one another in at least one of their associated types of exercise or their geographical routes.

The general aspect of the apparatus may include a route recommendation selector configured to select at least two exercise routes from the generated plurality of exercise routes according to predefined selection criteria, and transmit the selected exercise routes to the map generator.

The selection criteria may include preference information about a type of exercise preferred by the user.

The preference information may be obtained from information about a preferred type of exercise that has been chosen by the user from previously recommended exercise routes.

The preference information may be obtained from sensing data obtained from detecting a movement of the user.

In another general aspect, there is provided a method of recommending exercise routes, involving: obtaining exercise information comprising exercise amount data, exercise type data, and health care data; receiving at least two reference points that are displayable on a map based on map information; generating at least one geographical route between the reference points based on the map information and generating a plurality of exercise routes by associating at least one type of exercise with the at least one geographical route with reference to the exercise information; and generating a map on which the plurality of exercise routes are presented together with expected amounts of calories expended on the respective exercise routes.

The exercise information may be generated based on information manually input by a user or based on an expected amount of calories that is calculated from movements of the user identified from sensing information obtained by a sensor.

The exercise type data may include at least one of the following activities: being inactive, walking, running, and user-powered transport. The being inactive may correspond to not moving or moving by transportation equipment powered by a source other than a user's physical strength. The walking and running may correspond to an activity of moving by foot. The user-powered transport may correspond to an activity of moving by a transportation powered by a user's physical strength.

The generating of the plurality of exercise routes may include generating the plurality of exercise routes to be different from one another in at least one of their associated types of exercise or their geographical routes.

The general aspect of the method may further involve selecting at least two exercise routes from the generated plurality of exercise routes according to predefined selection criteria, and transmitting the selected exercise routes for the generating of the map.

The selection criteria may include preference information about a type of exercise preferred by the user.

The preference information may be obtained from information about a preferred type of exercise that has been chosen by the user from previously recommended exercise routes.

The preference information may be obtained from sensing data obtained from detecting a movement of the user.

In another general aspect, there is provided a method for recommending an exercise route, involving: receiving at least two reference points corresponding to geographic locations through an input unit of a mobile device; causing a processor of the mobile device to generate a plurality of exercise routes between the reference points by associating at least one type of exercise with geographical routes between the at least two reference points based on exercise information; and causing a display of the mobile device to display a map on which the plurality of exercise routes are displayed with at least one of expected amounts of calories expended on the respective exercise routes, expected difficulty level of the respective exercise routes, or expected energy level to be expended on the respective exercise routes.

The exercise information may include at least one of exercise amount data, exercise type data, and health care data.

The general aspect of the method may further involve receiving one route among the plurality of exercise routes as a user choice via the display, the display of the mobile device being a touch display.

In another general aspect, there is provided a non-transitory computer medium storing computer readable instructions that, when executed by a processor of a mobile device, cause a mobile device to perform the methods described above.

Other features and aspects will be apparent from the following detailed description, the drawings, and the claims.

Figure 1:
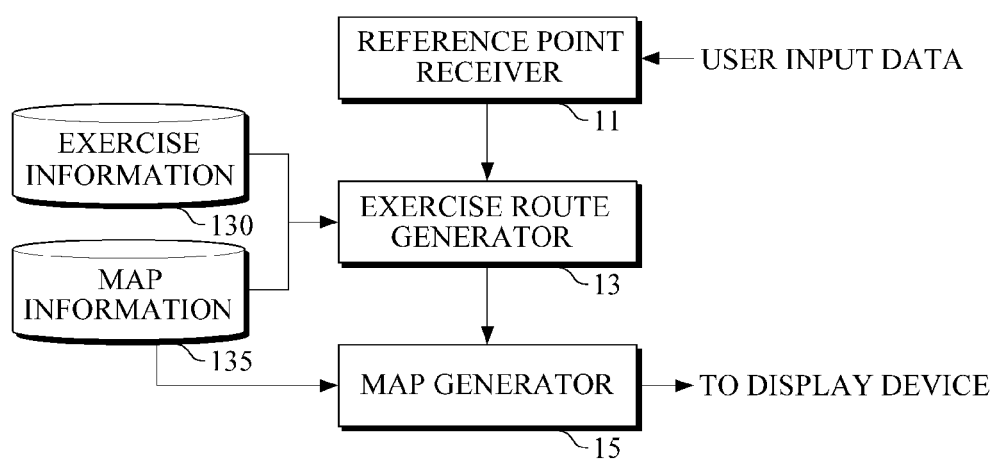
FIG. 1 is a diagram illustrating an example of an apparatus for recommending an exercise route.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, methods and apparatuses for recommending exercise routes according to various examples will be described in detail with reference to the accompanying drawings.

When a user decides to exercise, the route selection process for determining an exercise route may be influenced by different factors. For example, a user may or may not have a sufficient time to exercise, depending on a situation. Also, the user may choose to walk at least part of a route, which is otherwise to be traveled by vehicle, according to the weather or user's physical condition. Among various routes to an appointment location to be taken on foot or by public transportation, there may be different routes available for providing required exercise effects to the user. Further, there may be a type of exercise that the user prefers or would like to avoid. Therefore, a number of user-specific exercise routes may need to be recommended by taking into consideration the amount of exercise, as well as the type of exercise, so that the user can select an appropriate type and amount of exercise according to the user's situation.

To help a user exercise during daily life activities, routes suitable for exercises may be recommended when the user searches for a path using a navigation system or a map on the computing device. In this case, a number of routes available for exercise may be offered for the user to select according to the user's immediate circumstances. Further, the route recommendation may be made in consideration of a user's preferred type of exercise.

According to one embodiment, an apparatus and method for recommending exercise routes may make exercise route recommendations based on a variety of exercise information, which are considered suitable to a user, including exercise amount data, exercise type data, and health care data. Accordingly, it may be possible to provide exercise route recommendations for the user's health care and for the user to choose preferred exercise routes according to a user's situation, as well as to navigate a route to a destination.

The amount of exercise among the exercise information may be determined based on information input by the user, or based on information obtained from a sensor that detects the user's movement. The amount of exercise may include, for example, the maximum amount of calories the user is able to burn for health care in a day, the minimum amount of calories needed to be burnt for the user's health in a day, and the amount of calories expended so far during the day.

The selection of the amount of exercise may be based on the health information, such as the amount of calories needed to be expended in a day and the amount of calories consumed so far during the day.

A type of exercise as the exercise information may include walking, running, being inactive, user-powered transport, and the like. A type of exercise may be associated with a transportation choice. The transportation choice may include by foot, by vehicle, by exercise equipment or the like. The transportation choice by foot may include walking, running, being inactive, standing/sitting down, and the like, which are determined according to moving speed. When moving by vehicle, such as a bus, a taxi, or a car, the user may be considered to be inactive. User-powered transport refers to transport by human-powered equipment (for example, a bicycle, a roller board, and the like), not by an engine-powered means (for example, a car, a train, etc.).

The selection of an exercise type may be based on a distance of travel, a moving speed, an expected amount of calories to be expended, and topographical features. Also, information about a user's preferred exercise may be used to select the type of exercise.

An exercise route may be generated by combining the geographical route information, the selected adequate amount of exercise for the user, and the suitable type of exercise. The "exercise route" refers to a route that includes a geographical route with a variety of transportation choices, such as by foot (walking and running) and vehicle (being stationary), and a variety of exercises. The geographical route may be a geographical path from one location to another location, that is, from an origin to a destination. The geographical route may include one or more intermediate locations between the origin and the destination.

For user's selection, at least two exercise routes are recommended at a time. Geographically different routes associated with the same type of exercise may be recommended. The same geographical routes associated with different types of exercise may be recommended. Also, geographically different routes associated with different types of exercise may be recommended. One exercise route is associated with only one type of exercise or with two or more types of exercise.

The apparatus and method for recommending exercise routes may recommend exercise routes based on not only the exercise information but also preference information. Accordingly, it is possible to recommend exercise routes associated with a user's preferred type of exercise for maintaining user's health, as well as for showing directions to a destination.

The preference information may be determined by data that is input manually by the user. For example, the user may input a preferred type of exercise, such as, walking or running. In addition, the user may input riding a bicycle as the preferred type of exercise. Further, the user may input a travel partially on foot and partially by vehicle as a preferred type of exercise.

The preference information may be determined based on the exercise route selected among the previously recommended exercise routes. The user may select a preferred exercise route from the route recommendations. In this example, the type of exercise associated with the chosen exercise route may be regarded as a user's preferred type of exercise and then stored as preference information.

In addition, the preference information may be determined by detecting the user's actual movement. The movement information obtained by detection may be regarded as a user's preferred type of exercise, and then stored as preference information.

As such, the preference information that is manually input by the user, or is determined based on the exercise route chosen from route recommendations or based on the detection of the user's movement may be used as an important criterion for deciding a type of exercise to be associated with an exercise recommendation.

Examples of the apparatus and method for recommending exercise routes will be described with reference to the accompanying drawings.

FIG. 1 is a diagram illustrating an example of an apparatus for recommending exercise routes.

The exercise route recommendation apparatus 10 shown in FIG. 1 generates a plurality of exercise routes that are based on geographical routes available between received reference points, and displays the exercise routes on a map. The plurality of exercise routes are generated based on exercise information.

The exercise route recommendation apparatus 10 includes a number of components. In this example, the exercise route recommendation apparatus 10 includes a reference point receiver 11, an exercise route generator 13, exercise information 130, map information 135, and a map generator 15. The exercise information 130 and map information 135 are stored in non-transitory computer memories. The exercise route generator 13 and the map generator 15 may include one or more computer processor.

The reference point receiver 11 may receive locations displayable on a map, such as an origin, a destination, and an intermediate stop, as reference points. The reference point receiver 11 may include an input device such as a touch display or a keypad. The reference point receiver 11 may receive at least two reference points including an origin and a destination. For example, a user may input the reference points as an origin, an intermediate stop, or destination by selecting particular locations on the map shown on a display. In another example, a user's current location may be detected by a sensor, such as a global positioning system (GPS), and the detected location may be set as a reference point such as an origin.

The reference point is determined based on the map information 135. The map information 135 may include various previously stored information about a specific geographical point, such as topographical features, roads, buildings, traffic, streets, altitude, and the like. The map information 135 is well known in the existing navigation field.

The exercise information 130 may include data related to an amount of exercise, a type of exercise, health care, and the like. For example, exercise amount data may be quantified in calorific value, such as kilo-calorie (kcal). For example, the exercise amount data may include data related to the amount of exercise that the user has done or has to do in a day, such as the amount of calories that the user has to burn for a day or the amount of calories burnt by the exercises done between 12 AM to the hour in which a recommendation is made. Exercise type data may relate to various types of exercise, such as being stationary, walking, running, or other aerobic exercises using exercise equipment, such as a bike. In addition, the exercise type data may include data regarding a user's action that corresponds to a type of exercise.

For example, it is assumed that the exercise type data includes being inactive, walking, running, and using user-powered transport. In this example, "being inactive" may indicate that the user remains still but moves for a predetermined distance. Thus, "being inactive" may be predetermined to correspond to a user's activity of moving from one place to another using a transportation driven by power other than the user's physical strength, such as a vehicle including a bus, a taxi, or a car. That is, if the user moves from one place to another by riding a bus, the user may be determined to be inactive although the user physically moved from one geographic location to another location. On the other hand, walking and running (or jogging) may be predetermined to correspond to a user's activity of moving on foot. Walking is distinguished from running based on a moving speed. The user-powered transport may be predetermined to correspond to a user's activity of moving by a human-powered transportation, which may include exercise equipments, such as a bike, rollerblade, and the like.

Health care data may include data related to exercises that may be performed for maintaining good health. For example, assuming that a user is going on a diet to lose weight and needs to exercise to lose weight, the health-care data may include various kinds of data including user's current weight, target weight to lose, a duration of diet, the total amount of exercise to be done during the time the user is on diet, a recommended daily amount of exercise, and the like.

The exercise information 130 may be generated based on data related to an amount of exercise, a type of exercise, and health care, which may be manually input by the user. According to one example, the user may manually choose and input a desired amount of exercise, a desired type of exercise, and the like. For example, the user may input only physical data, such as weight and height, and the exercise information 130 that includes a recommended amount of exercise, a recommended type of exercise, and health-care data may be automatically generated based on the physical data.

In another example, at least part of the exercise amount data or exercise type data of the exercise information 130 may be generated by a smartphone processor based on data obtained by a sensor equipped in a smartphone of the user. This example will be described in detail with reference to FIGS. 2 and 3.

The exercise route generator 13 may generate a plurality of exercise routes with reference to the exercise information 130 and the map information 135. The exercise route generator 13 may generate at least one geographical route that connects reference points, that is, an origin to a destination. According to one example, the geographical route may be generated with reference to map information, such as roads, buildings, and topographical features, in such a manner that enables the user to reach a destination within a range of a predetermined period of time in conjunction with a predetermined distance.

There may be generated a plurality of geographical routes. Then, the exercise route generator 13 may specify an exercise that the user may perform while moving along each of the geographical routes. In this example, the exercise route generator 13 may refer to such data as previously defined in the exercise information 130, and the data may include the amount of exercise, a type of exercise, health care, and the like. In other words, the exercise route generator 13 may add data about a type of exercise associated with a transportation choice, such as walking, running, a car, a bicycle, and the like, to the geographical route from the origin to the destination, based on a needed amount of exercise for the user. As such, the exercise route may be generated by including the type of exercise in the geographical route. The exercise route generator 13 may recommend a plurality of exercise routes to allow the user to select the most desired one according to the user's current situation.

Then, the map generator 15 may display the plurality of exercise routes generated by the exercise route generator 13 on the map, as well as an expected amount of calories to be expended on each exercise route. The map generator 15 may output the exercise routes to a display device for visible representation.

The exercise route recommendation apparatus 10 allows the user to input reference points, such as an origin, a destination, and the like, on the map displayed on a desktop computer or a smartphone, and then at least two exercise routes from the origin to the destination may be displayed on the map. Each of the exercise routes may include a type of exercise, such as walking, running, vehicles, or the like. In addition, an amount of exercise quantified as calories to be expended on each exercise route may be also displayed. Examples of the exercise routes displayed on the map will be described below in detail with reference to FIGS. 4 to 6.

Figure 2:
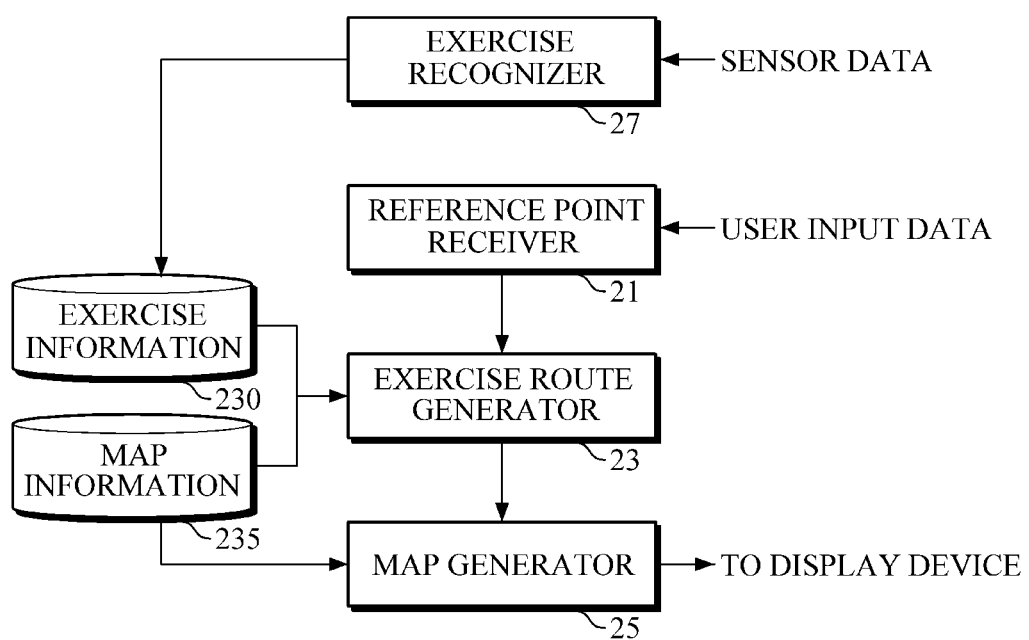
FIG. 2 is a diagram illustrating another example of an apparatus for recommending an exercise route.

FIG. 2 illustrates another example of an exercise recommendation apparatus.

Referring to FIG. 2, an exercise recommendation apparatus 20 generates a plurality of exercise routes with reference to exercise information based on a geographical route that connects received reference points. In this example, the exercise information may be produced based on sensing data obtained by a sensor.

The exercise route recommendation apparatus 20 may include a number of components. In this example, the exercise route recommendation apparatus 20 includes a reference point receiver 21, an exercise route generator 23, exercise information 230, map information 235, a map generator 25, and an exercise recognizer 27.

Similar to the reference point receiver 11 of FIG. 1, the reference point receiver 21 may receive locations displayable on a map, such as an origin, a destination, and an intermediate stop, as reference points. The exercise route generator 23 may generate a plurality of exercise routes with reference to the exercise information 230 and the map information 235 in a similar manner to the exercise route generator 13 of FIG. 1. The map generator 25, as similar to the map generator 15 of FIG. 1, may display the plurality of exercise routes generated by the exercise route generator 23 on the map, together with an expected amount of exercise associated with each of the exercise routes. The map information 235, as similar to the map information 135 of FIG. 1, is previously stored and includes various data related to a particular geographical location, such as topographical features, roads, buildings, altitude, and the like.

Similar to the exercise information 130 of FIG. 1, the exercise information 230 may include data related to an amount of exercise, a type of exercise, health care, and the like. The exercise information 230 may be generated based on data that the user manually inputs about an amount of exercise, a type of exercise, and health care. In addition, at least part of the exercise information 230 may be generated by the exercise recognizer 27.

The exercise recognizer 27 may recognize an exercise of a user based on sensing data obtained by a sensor. The exercise recognizer 27 may recognize an action of the user based on the sensing data, and generate the exercise information 230 by identifying the amount of exercise performed by the recognized action and the performed type of exercise. Examples of the exercise information generated by the exercise recognizer will be described below in detail with reference to FIG. 3.

Figure 3:
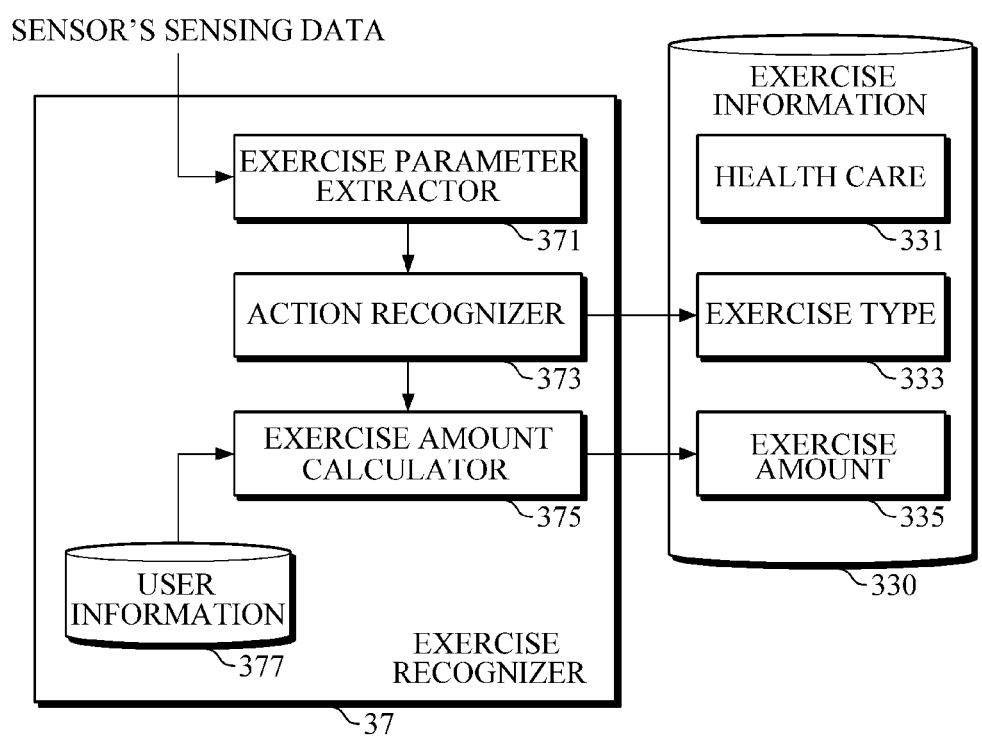
FIG. 3 is a diagram illustrating an example of an exercise recognizer for generating exercise information in an apparatus for recommending an exercise route.

FIG. 3 is a diagram illustrating an example of an exercise recognizer for generating exercise information in an exercise route recommendation apparatus.

Referring to FIG. 3, an exerciser recognizer 37 may include an exercise parameter extractor 371, an action recognizer 373, an exercise amount calculator 375, and user information 377. The exercise information 330 may include health care data 331, exercise type data 333, and exercise amount data 335.

Sensing data obtained by a sensor may include a location coordinates value, an acceleration value, and the like, which are obtained by a global positioning system (GPS), an acceleration sensor, and the like. Here, the sensing data may be obtained by detecting a user's action.

The exercise parameter extractor 371 extracts exercise parameters that represent a user's location, a moving direction of a user, a moving speed of a user, and the like, based on the sensing data. The exercise parameters that may be extracted from the sensing data may represent or make a type of exercise of a user distinguishable. A type of exercise of the user may include being inactive or moving by a motor vehicle, walking, running, and the like. One of the most important factors to distinguish a type of exercise from another type is a variation in a location of the user, that is, a distance traveled within a predetermined time span, and a moving speed at which the user moves from one position to another position. As such, the exercise parameter extractor 371 may extract exercise parameters for representing a travelling distance, a moving speed, a moving direction, and the like.

The action recognizer 373 may recognize an action of a user based on the exercise parameters extracted by the exercise parameter extractor 371. The action recognizer 373 may identify whether the user is walking, running, moving on a bicycle, or moving by other transportation choice, based on the exercise parameters that represent a moving distance, a moving direction, a moving speed, and other factors.

The user's action identified by the action recognizer 373, which is an exercise that has been actually performed by the user, may be added to exercise type data 333 in the exercise information 330.

The exercise amount calculator 375 may calculate an amount of energy expended during each action identified by the action recognizer 373. This calculation may be performed with reference to user information 377. The user information 377 may include user's body measurement information that is input manually by the user, including height, weight, and the like. The user information 377 may include personal information, such as a gender, an age range, and the like.

The amount of energy expended during each of the recognized user actions may be calculated with reference to the body measurement information, such as the user's weight. For example, in the event that a user weighing 50 kg has walked at a normal speed for 50 minutes, it may be calculated that 150 kcal has been expended. In the event that a user weighing 80 kg has walked at a normal speed for 50 minutes, it may be calculated that 240 kcal has been expended. In these examples, a well-known algorithm may be used for the calculation.

The calculated data, which is exercise-amount information that is actually expended by the user, may be added to exercise amount data 335 of the exercise information 330.

The exercise recognizers 27 and 37 of FIGS. 2 and 3 identify the user's action based on sensing data obtained by detecting a motion of the user. Thus, the exercise route recommendation apparatus 20, which includes the exercise recognizer, is equipped with a sensor that detects a motion of the user, and may be implemented within a mobile computing device that is worn or possessed by the user, such as smart glasses, smart watch, or a smartphone, for example.

Figure 4:
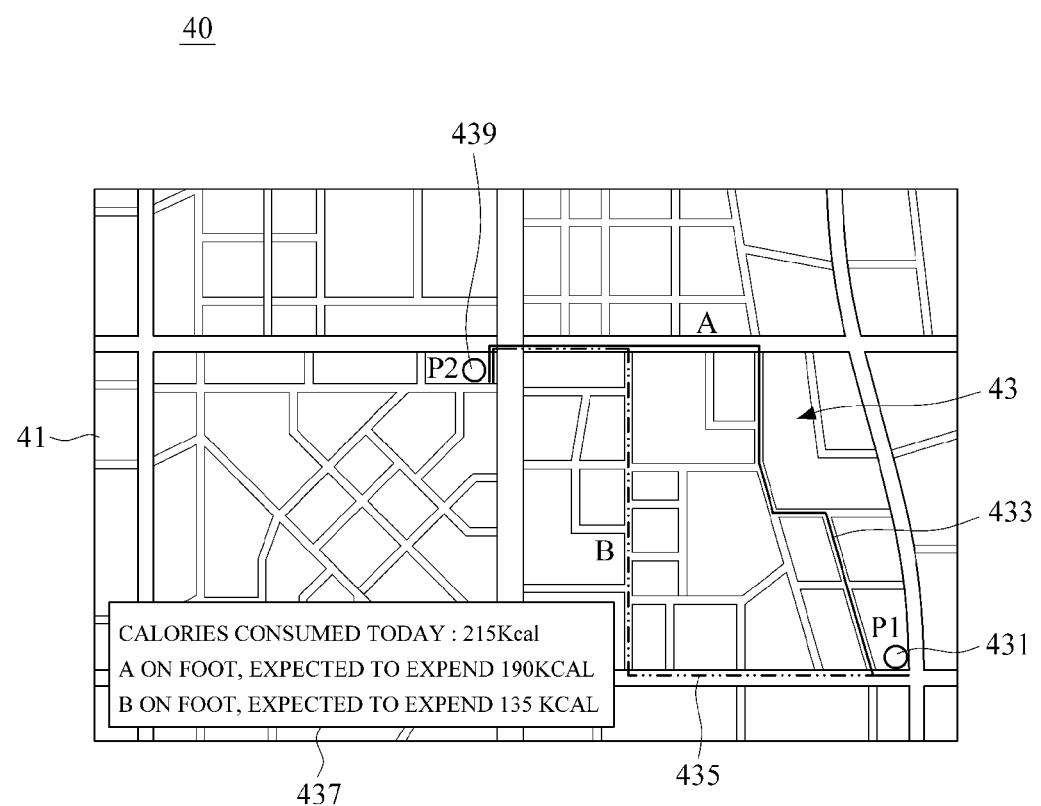
FIG. 4 is a diagram illustrating an example of a map on which route recommendations are displayed by an apparatus for recommending an exercise route.
Figure 5:
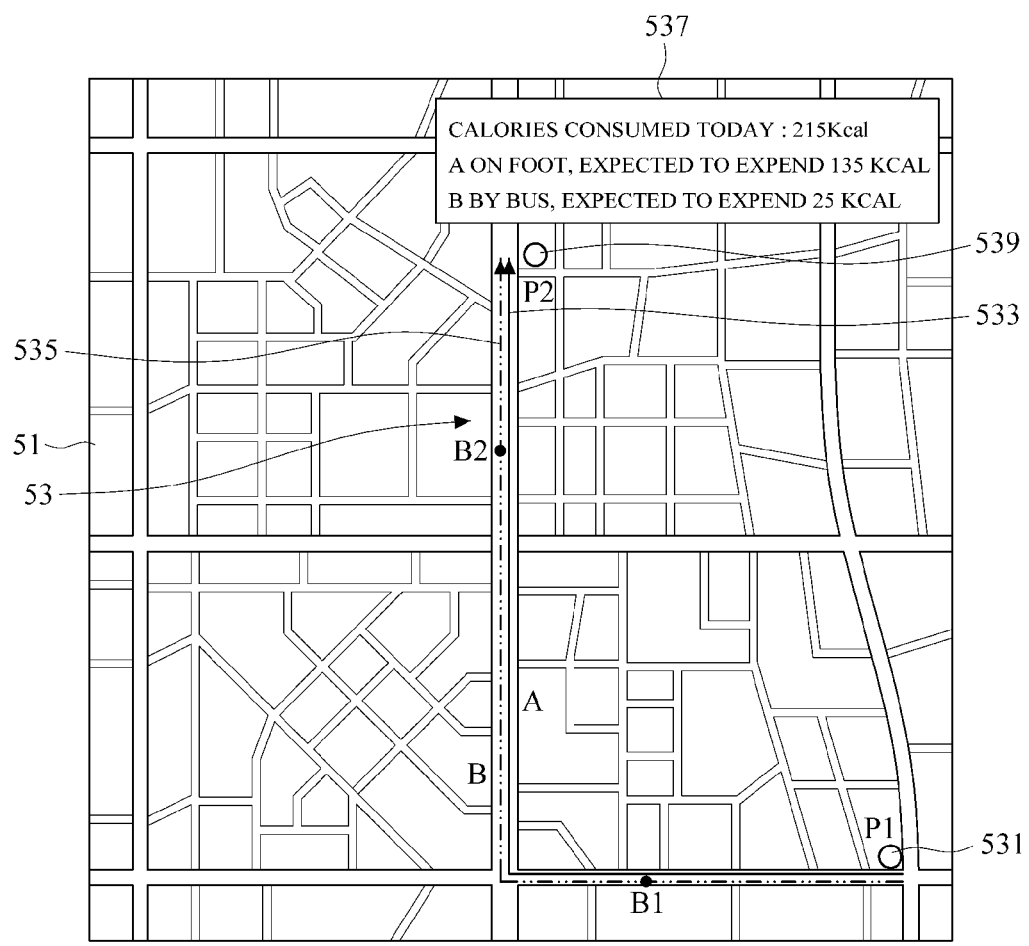
FIG. 5 is a diagram illustrating another example of a map on which route recommendations are displayed by an apparatus for recommending an exercise route.
Figure 6:
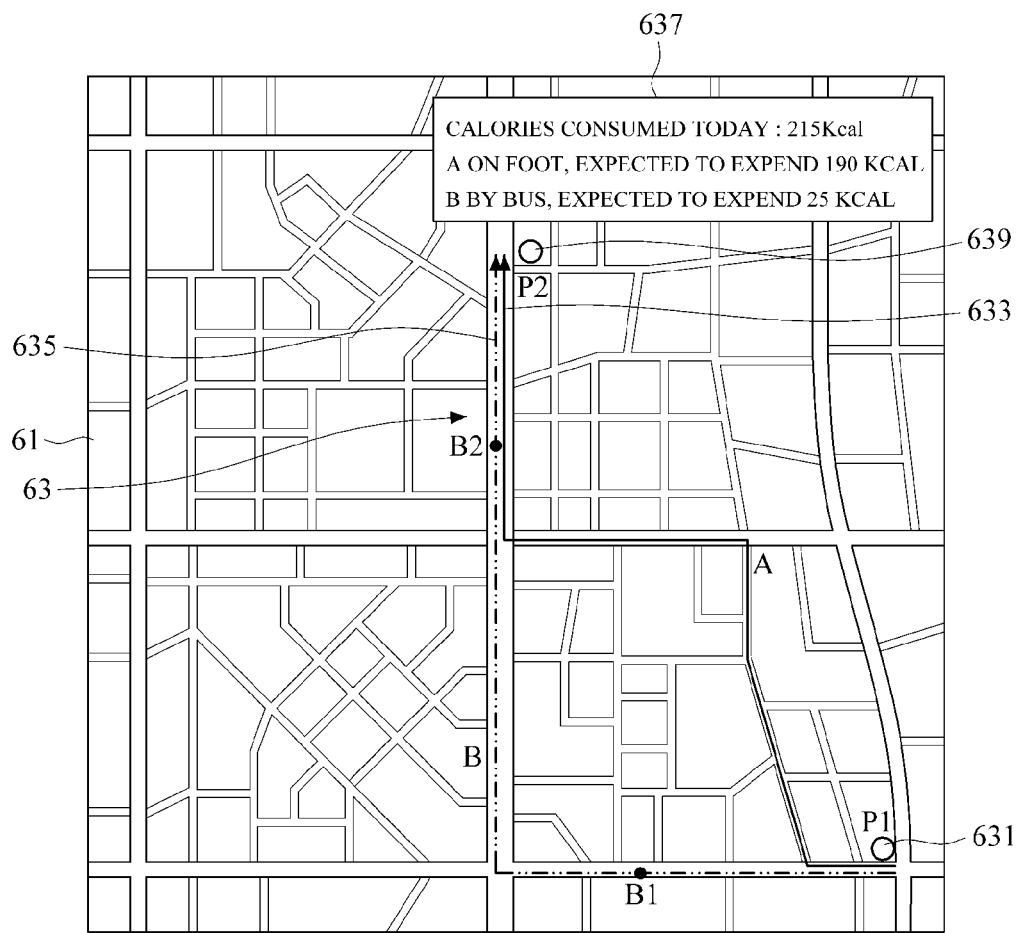
FIG. 6 is a diagram illustrating a map on which route recommendations are displayed by an apparatus for recommending an exercise route.

Examples of displaying a plurality of exercise routes on a map will be described with reference to FIGS. 4 to 6. A plurality of exercise routes displayed on a map is routes recommended to a user and will be herein referred to as "route recommendations." The route recommendations may include a plurality of different geographical routes that are associated with the same type of exercise, as shown in FIG. 4. In addition, the route recommendations may include the same geographical routes that are associated with different types of exercise, as shown in FIG. 5. Further, the route recommendations may include different geographical routes that are associated with different types of exercise, as shown in FIG. 6.

FIG. 4 is a diagram illustrating an example of a map displaying route recommendations from an exercise route recommendation apparatus.

Referring to FIG. 4, a map 40 includes route recommendations displayed on a map area 41 of a particular geographical region. In this example, the route recommendations 43 include two different geographical routes that are associated with the same type of exercise, i.e., traveling on foot. However, different number of routes may be displayed in another example. Further, more than one type of exercise may be suggested on a map.

The route recommendations 43 include two exercise routes, exercise route A 433 and exercise route B 435, both connecting origin P1 431 to destination P2 439. Exercise route A 433 is for travelling on foot and represented by a solid line with a shorter distance, passing through a hill, as compared to exercise route B 435. Exercise route B 435 is represented by dotted lines with a longer distance while passing through flat roads, in comparison to exercise route A.

In addition, a labeling section 437 is further displayed on the map 40, indicating expected calories to be expended on each exercise route. However, the labeling section 437 may be removable, displayed in another manner, or not displayed in another example. Referring to FIG. 4, the displayed labeling section 437 displays information such as the current amount of calories expended during the day, a type of exercise (for example, traveling on foot) associated with route recommendation A and route recommendation B, and expected calories to be expended, but these are provided only for purpose of examples. In other examples, the information shown in the labeling section 437 may vary. For example, the labeling section 437 may include expected difficulty level based on how strenuous the exercise is expected to be or expected energy level to be expended on each route. In another example, the labeling section 437 may include information about an amount of exercise to be performed per day, a total distance of travel from the origin 431 to the destination 439, additional information about important locations between the origin 431 and the destination 439, an estimated time of travel, and other information. Also, referring to FIG. 4, although the type of exercise associated with both exercise routes A and B is "traveling on foot" in the labeling section 437, a detailed type of exercise, for example, "walking" or "running," may be displayed, rather than "traveling on foot." In addition, the type of exercise may be further specified. For example, the type of exercise may be specified as "walking slowly," "walking normal speed," and "walking quickly."

Referring to FIG. 4, the labeling section 437 is displayed within the map area 41, but aspects of the present disclosure are not limited thereto, such that the labeling section 437 is presented outside of the map area 41, or displayed in a balloon that appears in response to a mouse click or a double-tap with a finger on a particular point within the map area 41.

FIG. 5 is a diagram illustrating another example of a map on which route recommendations are displayed by an exercise recommendation apparatus.

Referring to FIG. 5, a map 50 includes route recommendations 53 displayed on a map area 51 that shows a particular region. The route recommendation 53 may include the same geographical routes that are associated with different types of exercises.

The route recommendations 53 include two exercise routes, exercise route A 533 and exercise route B 535, both connecting origin P1 531 to destination P2 539. A labeling section 537 is further displayed in a map area 51 of the map 50, showing an expected amount of calories to be expended on each exercise route.

In this example, exercise route A 533 and exercise route B 535 are geographically the same, but exercise route A 533 is associated with a particular type of exercise, i.e., traveling on foot, while exercise route B 535 is associated with traveling by bus. Exercise route B 535 involves with various types of exercises including traveling on foot, by bus, and on foot. In other words, according to exercise route B, the user moves on foot from P1 531 to bus stop B1, then moves by bus from B1 to another bus stop B2, and then moves on foot from B2 to final destination P2 539.

Although details are omitted in the drawings for convenience of illustration, exercise route B 535 may have more bus stops, as well as bus stops B1 and B2, within the map area 51. Further, there may be one or more bus stops between P1 and B1 or between B2 and P2.

FIG. 6 is a diagram illustrating an example of a map on which route recommendations are displayed by an exercise route recommendation apparatus.

Referring to FIG. 6, a map 60 includes route recommendations 63 displayed on a map area 61 that shows a particular geographic region. The route recommendations 63 include different geographical routes associated with different types of exercises.

The route recommendations 63 include two exercise routes, exercise route A 633 and exercise route B 635, both connecting origin P1 631 to destination P2 639. In addition, a labeling section 637 is further displayed in the map area 61, showing an expected amount of calories to be expended on each exercise route. In this example, exercise route A 633 is to be taken on foot, while exercise route B 635 is to be taken on foot, by bus, and on foot, and exercise route A 633 and exercise route B 635 include geographically different paths from each other.

As described with reference to FIGS. 4 to 6, a plurality of exercise routes may be recommended to the user. Each exercise route may be assigned a designated type of exercise that the user is able to practically perform, and may display an amount of exercise related to the expected amount of calories to be expended. The user may choose one that seems suitable to the user's situation or emotional state, from among the plurality of recommended exercise routes. For example, the display may be a touch display allowing the user to select a route by touch or by use of a stylus. Further, the user may request the apparatus to make another recommendation, without selecting one from the exercise routes currently displayed on the map.

Figure 7:
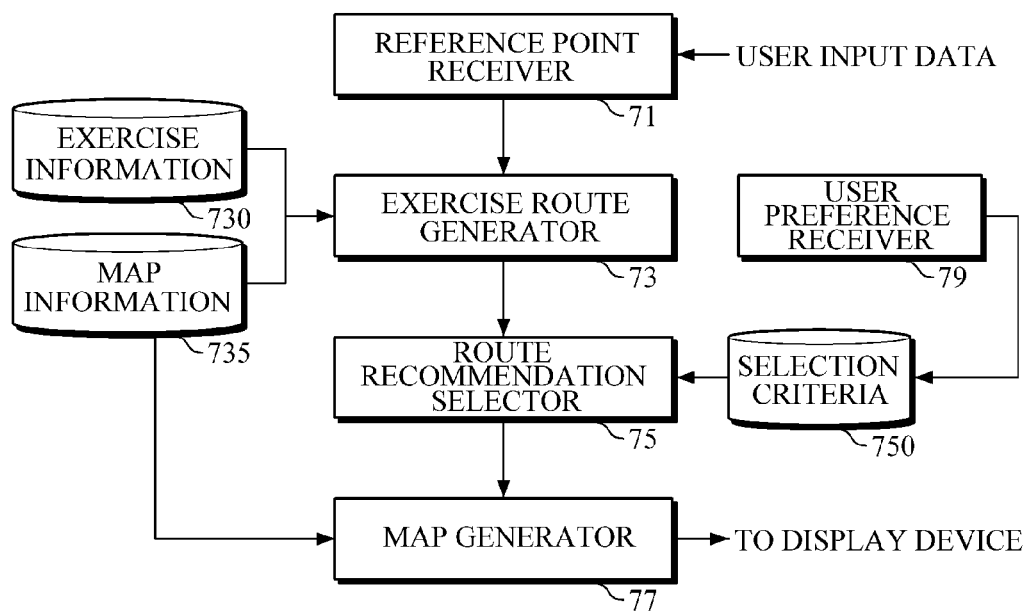
FIG. 7 is a diagram illustrating another example of an apparatus for recommending an exercise route.

FIG. 7 is a diagram illustrating another example of an exercise recommendation apparatus.

The example illustrated in FIG. 7 is an exercise recommendation apparatus 70 that generates a plurality of exercise routes based on geographical routes, each of which connects received reference points, with reference to exercise information, and selects and displays a route recommendation from among the plurality of generated exercise routes.

The exercise route recommendation apparatus 70 include a number of components. In this example, the exercise route recommendation apparatus 70 includes a reference point receiver 71, an exercise route generator 73, exercise information 730, map information 735, a route recommendation selector 75, selection criteria 750, a map generator 77, and a user preference receiver 79. The exercise route generator 73, route recommendation selector 75, and map generator 77 may include one or more computer processor. The exercise information 730 and map information 735 may be stored in a non-transitory computer memory.

Similar to the reference point receiver 11 of FIG. 1, the reference point receiver 71 may receive positions displayable on a map, such as an origin, a destination, and an intermediate stop, as reference points. The exercise route generator 73, similar to the exercise route generator 13 of FIG. 1, may generate a plurality of exercise routes with reference to the exercise information 730 and the map information 735. Similar to the map information 135 of FIG. 1, the map information 735 may include a variety of information related to a particular geographical position, for example, information about topographical features, roads, buildings, traffic, distance, altitude, and the like. Similar to the exercise information 130 of FIG. 1, the exercise information 730 may include data related to an amount of exercise, a type of exercise, health care, and the like.

The route recommendation selector 75 may select at least two exercise routes from the plurality of exercise routes generated by the exercise route generator 73, according to the predefined selection criteria 750, and deliver the selected exercise routes to the map generator 77.

The selection criteria 750 may be previously defined. For example, the selection criteria 750 may include criteria that are based on an expected amount of exercise. In this example, according to the selection criteria 750, an exercise route whose predicted amount of energy expended is the greatest may be selected, or an exercise route whose predicted amount of energy expended is moderate may be selected from among the plurality of generated exercise routes. Alternatively, the selection criteria 750 may include criteria that are based on recommendation history data. In this case, according to the selection criteria 750, an exercise route that has never been recommended before may be given priority and selected, or an exercise route that has been recommended and selected before by the user may be given priority and selected again.

Further, the selection criteria 750 may be defined by user preference information obtained by the user preference receiver 79. The user preference information may include a criterion related to a user's preferred type of exercise. For example, the user preference receiver 79 may provide diverse types of exercises on a display to enable the user to select a preferred type of exercise among them. The user may select a type of exercise, for example, "travel mostly by bus and partially on foot," as a preferred type of exercise. Then, the user preference receiver 79 may obtain information about "travel mostly by bus and partially on foot" as preference information and store the obtained information as a selection criterion 750. Then, the route recommendation selector 75 may select an exercise route based on the information about "travel mostly by bus and partially on foot" that is stored in the selection criteria 750.

The map generator 77, which is similar to the map generator 15 of FIG. 1, may display the at least two exercise routes selected by the route recommendation selector 75, rather than the exercise routes generated by the exercise route generator 73, as well as the expected amount of calories to be expended on each route. The map generator 77 may display the routes on a display device.

Figure 8:
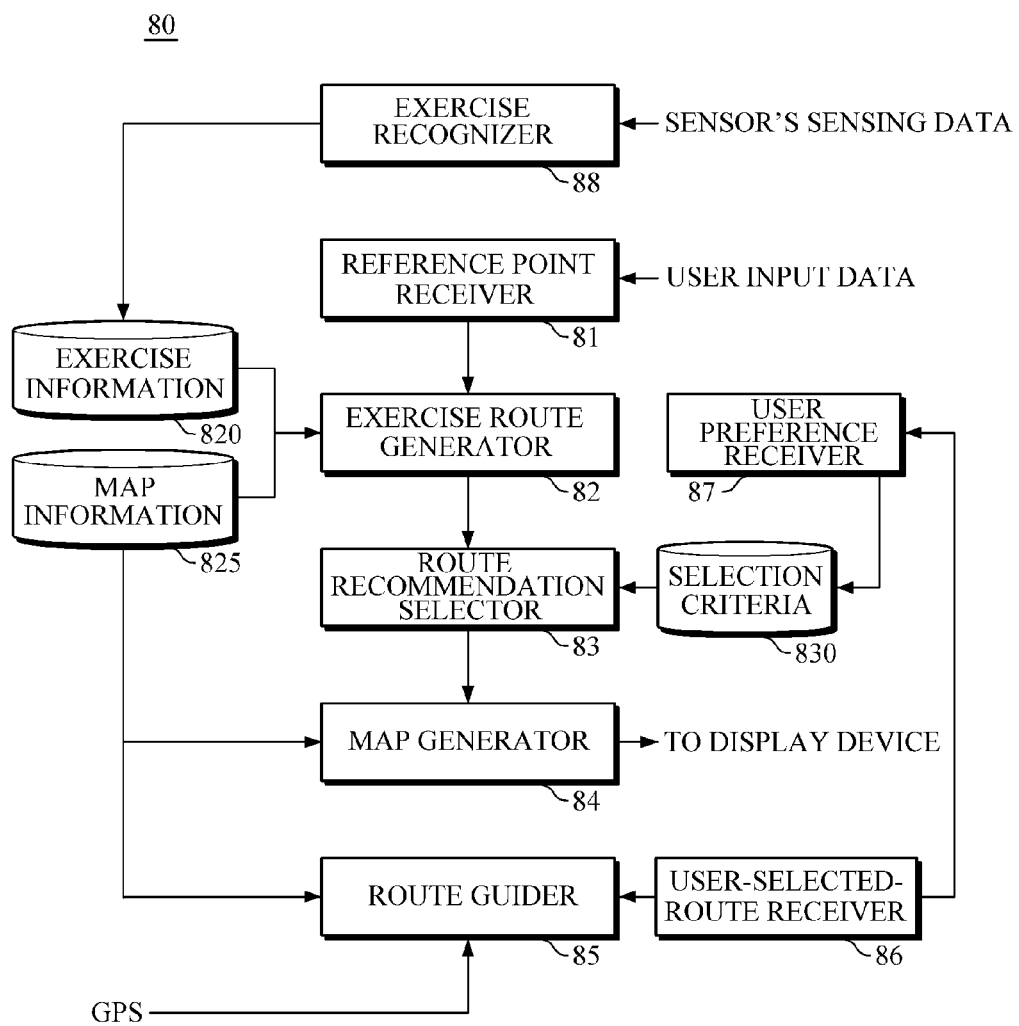
FIG. 8 is a diagram illustrating another example of an apparatus for recommending an exercise route.

FIG. 8 is a diagram illustrating another example of an exercise route recommendation apparatus.

The example illustrated in FIG. 8 shows an exercise route recommendation apparatus 80 that generates a plurality of exercise routes based on geographical routes, each connecting received reference points, with reference to exercise information, selects route recommendations from among the plurality of generated exercise routes, then displays the selected route recommendations on a map, and guides an exercise route that the user has selected.

The exercise route recommendation apparatus 80 may include various components. In this example, the exercise route recommendation apparatus 90 includes a reference point receiver 81, an exercise route generator 82, exercise information 820, map information 825, a route recommendation selector 83, selection criteria 830, a map generator 84, a route guider 85, a user-selected-route receiver 86, a user preference receiver 87, and an exercise recognizer 88. The exercise information 820, map information 825, and selection criteria 830 may be stored in one or more non-transitory computer memories.

Similar to the reference point receiver 11 of FIG. 1, the reference point receiver 81 may receive locations displayable on a map, such as an origin, a destination, and an intermediate stop, as reference points. The exercise route generator 82 may generate a plurality of exercise routes with reference to the exercise information 820 and the map information 825 in a similar manner to the exercise route generator 13 of FIG. 1. The map information 825, as similar to the map information 135 of FIG. 1, is previously stored and may include a variety of information about a particular geographical location, such as information about topographical features, roads, buildings, traffic, distance, altitude, and the like, of the location. Similar to the exercise information 130 of FIG. 1, the exercise information 820 may include data related to an amount of exercise, a type of exercise, health care, and the like.

The route recommendation selector 83 may select at least two exercise routes from among the plurality of exercise routes generated by the exercise route generator 82, according to predefined selection criteria 830, in a similar manner to the route recommendation selector 75 of FIG. 7. The map generator 84, similar to the map generator 77 of FIG. 7, may display the at least two exercise routes selected by the route recommendation selector 83, together with an expected amount of calories to be expended on each exercise route.

Similar to the exercise recognizers 27 and 37 of FIG. 2 and FIG. 3, the exercise recognizer 88 may recognize an exercise of the user based on sensing data obtained by a sensor.

The user may select one exercise route from the map (for example, the maps of FIGS. 4 to 6) generated by the map generator 84. The user-selected-route receiver 86 receives the user's selected route. In response to a user's selection of a particular exercise route, the route guider 85 may guide the route based on a current position of the user with reference to GPS signals.

The selection criteria 830 may be previously defined. Further, the selection criteria 830 may be defined by user preference information obtained by the user preference receiver 87. The user preference receiver 87 may obtain information about a preferred type of exercise manually chosen by a user, as the preference information, and include the obtained information in the selection criteria 830.

In addition, the user preference receiver 87 may obtain information about a user's preferred type of exercise based on an exercise recognized from the sensing data acquired by the sensor that detects an actual motion of the user. In the illustrated example, the exercise recognizer 88 may recognize an actual action of the user based on the sensing data. The user preference receiver 87 may receive data related to the user action from the exercise recognizer 88, and obtain information about a type of exercise that the user has performed. The user preference receiver 87 may include the type of exercise actually performed by the user in the selection criteria 830.

Further, the user preference receiver 87 may obtain the information about user's preferred type of exercise from exercise route data that the user has selected from previously recommended exercise routes so as to receive route guidance, or from preferred exercise routes selected from the previous exercise route recommendations. In the illustrated example, the user-selected-route receiver 86 may receive data related to the exercise route selected by the user to receive the route guidance from among the recommended exercise routes. The user preference receiver 87 may receive the data related to the exercise route selected by the user from the user-selected-route selector 86, and obtain the information about a type of exercise that the user has selected to receive route guidance. The user preference receiver 87 may include in the selection criteria 830 a type of exercise that is identified from the information about the type of exercise selected by the user.

Exemplary embodiments of a method for recommending exercise routes will be described below with reference to FIGS. 9 to 13.

Figure 9:
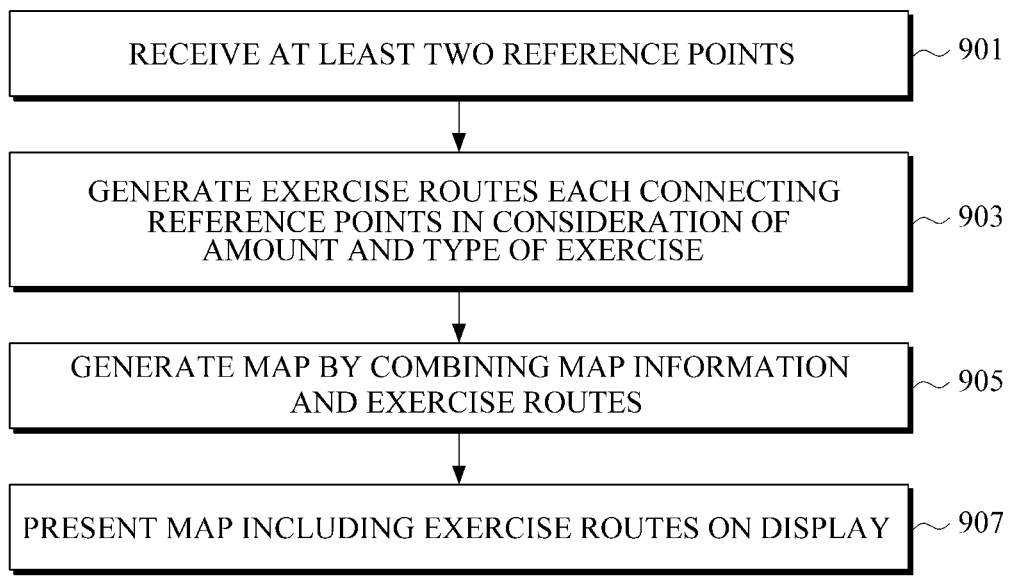
FIG. 9 is a flowchart illustrating an example of a method for recommending an exercise route.

FIG. 9 is a flowchart illustrating an example of a method for recommending an exercise route.

The example illustrated in FIG. 9 shows a method 900 for recommending a plurality of exercise routes among which the user chooses. The method 900 may be performed by an apparatus for recommending an exercise route. According to one example, the apparatus may be a mobile device; however, the present disclosure is not limited thereto.

In 901, at least two reference points are received from the user. The received reference points may include an origin, a destination, and intermediate stops between the origin and the destination. For example, the receiving of the reference points may be performed by an input device of a mobile device, such as a touch display, a keypad, a microphone or a combination thereof.

In response to receiving the reference points, a plurality of exercise routes, each of which connects the reference points, may be generated with reference to exercise information and map information in 903. The exercise route may be generated with reference to an amount of exercise, a type of exercise, and data about a user's health care.

In response to the generation of the exercise routes, a map that displays the exercise routes on a map area that includes the origin and the destination may be generated in 905.

The exercise routes displayed on the map include at least two routes. These routes may be different in terms of at least one of their associated type of exercise and geographical route. In other words, if the exercise routes are associated with the same type of exercise, their geographical routes are different from each other. However, if the exercise routes are the same in their geographical routes, their associated types of exercise are different from each other. The exercise routes may be different in their associated types of exercise and geographical routes.

Then, the map including the exercise routes may be output to the user by displaying the same on a display in 907. The displayed map may be similar to any of the maps described above with reference to FIGS. 4 to 6.

Figure 10:
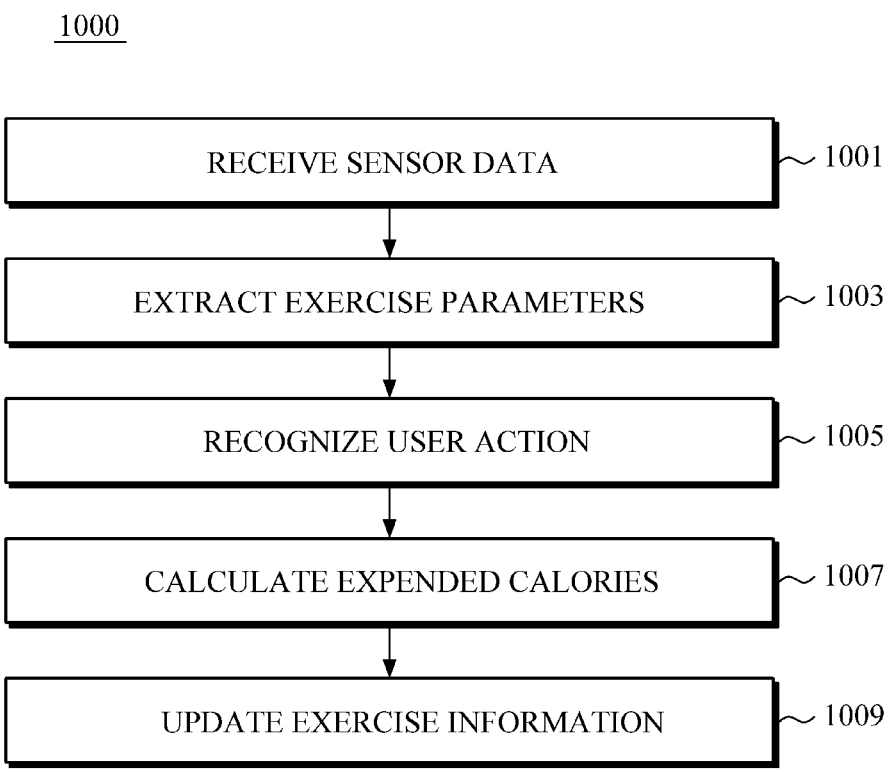
FIG. 10 is a flowchart illustrating an example of a method of recommending an exercise route.

FIG. 10 is a flowchart illustrating an example of an exercise recognition process for tracking exercise performed in an exercise route recommendation method.

FIG. 10 illustrates an example of an exercise recognition process 1000 for tracking exercise performed based on sensing data detected by a sensor equipped in, for example, a smartphone possessed by a user. By tracking the exercise performed, exercise information for recognizing the amount of exercise performed by the user may be determined.

In 1001, the sensing data are received from a sensor, such as a GPS sensor, an acceleration sensor, and the like, which can detect a motion of a user. Then, exercise parameters are extracted from the sensing data in 1003. The exercise parameters may represent a user's travel distance, a travel time, a speed of travel, a direction of movement, and the like. Based on the exercise parameters, the exercise performed by the user may be recognized and qualified in 1005. The user's action may include being inactive, such as moving by vehicle, walking, running, moving by bicycle, and the like. Then, an amount of calories expended, that is, an amount of exercise on each action of the user is calculated in 1007. In 1009, the exercise information may be updated by storing the recognized action as exercise type data and the calculated amount of calories as exercise amount data.

The exercise recognition process 1000 may be constantly performed during the user's daily activities. Accordingly, for example, the amount of calories expended during the day from exercise may be cumulatively calculated, and the cumulative amount of calories expended from exercise may be used as an important factor for making route recommendations.

Figure 11:
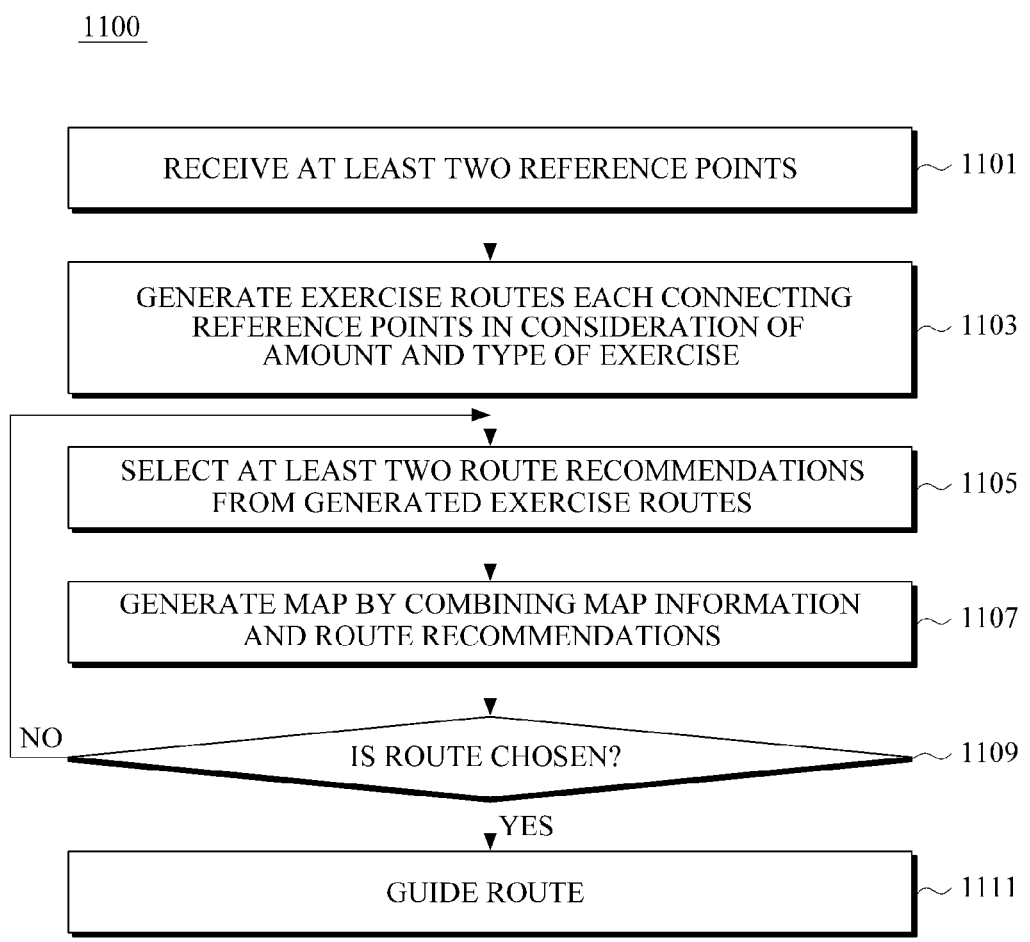
FIG. 11 is a flowchart illustrating another example of a method of recommending an exercise route.

FIG. 11 is a flowchart illustrating another example of a method for recommending exercise routes.

FIG. 11 illustrates an example of an exercise route recommendation method 1100 in which a plurality of exercise routes are recommended to a user to allow the user to select therefrom. Then, route guidance is provided for the selected exercise route.

In 1101, at least two reference points are received. In response to receiving the reference points, a plurality of exercise routes, each connecting the reference points, are generated with reference to exercise information and map information in 1103. In response to generating the exercise routes, at least two route recommendations may be selected from the generated exercise routes, according to predefined selection criteria in 1105. In response to selecting the route recommendation, a map that displays the exercise routes on a map area that includes an origin and a destination may be generated 1107. Then, the map showing the exercise routes are displayed on a display, and it is determined whether the user has selected one route from the map in 1109.

In operation 1109, for example, a route selection button and a route recommendation request button may be provided for each exercise route. In response to the user's clicking on one route selection button, it may be determined that the exercise route corresponding to the clicked button is selected from the plurality of exercise routes presented on the map. In response to the user's clicking on one route recommendation request button, it may be determined that the user has not chosen any exercise route.

In response to the determination that the user has not chosen any exercise route (No in 1109), the flow proceeds back to operation 1105 in which other exercise routes are selected as route recommendations, and operation 1107 is repeated in which the route recommendations are presented on the map.

In response to a determination that the user chooses one route (YES in operation 1109), the route guidance for the selected route is provided in 1111.

Figure 12:
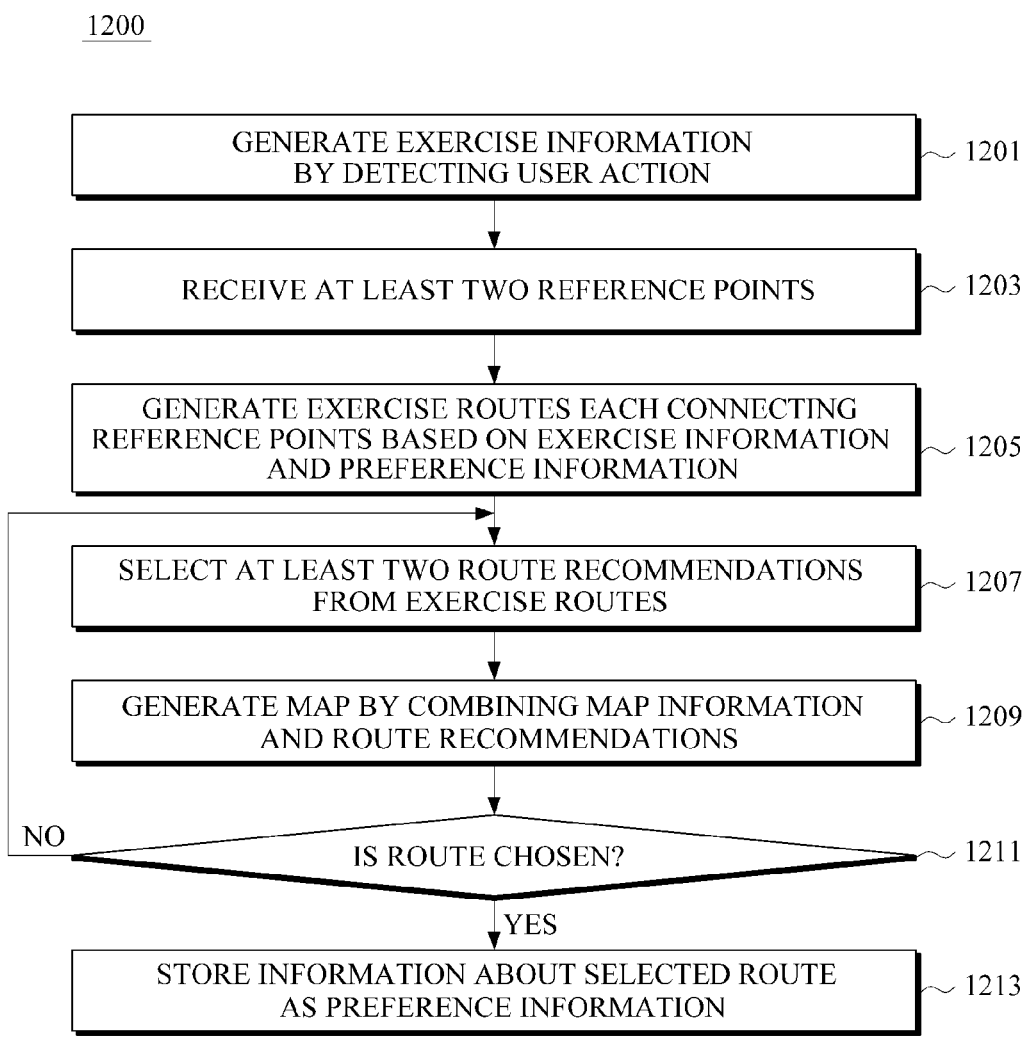
FIG. 12 is a flowchart illustrating another example of a method of recommending an exercise route.

FIG. 12 is a flowchart illustrating another example of an exercise recommendation method.

FIG. 12 illustrates an example of an exercise recommendation method 1200 in which exercise information is generated based on detection of an action of a user, a plurality of exercise routes are recommended among which the user selects, and an exercise route selected by the user is stored as user preference information.

In 1201, a user's action may be detected and exercise information may be generated. Operation 1201 may be performed by the exercise recognition process 1000 described with reference to FIG. 10.

In 1203, at least two reference points are received. In response to receiving the reference points, a plurality of exercise routes, each connecting the reference points, may be generated with reference to the exercise information and map information in 1205. Then, in 1207, at least two route recommendations may be selected from the plurality of generated exercise routes according to predefined selection criteria. The selection criteria may be determined by user's preference information. In operation 1207, it is possible to select only one route recommendation.

In response to selecting one or more exercise routes as route recommendations, a map with a map area, which includes an origin and a destination and has exercise routes presented thereon, may be generated in 1209. There may be a number of exercise routes present on the map. Only one or more route recommendations, among the displayed exercise routes, may be, for example, highlighted, or represented in a separate color. In another technique, only route recommendations among the exercise routes may be presented on the map. Then, in 1211, it may be determined whether or not the user has chosen one route from the map, which includes the exercise routes, and is presented on the display.

In 1211, for example, route selection buttons and route recommendation request buttons associated with the respective exercise routes may be provided to the user. In response to the user's clicking on one route selection button, it may be determined that the exercise route corresponding to the clicked route selection button is chosen among the plurality of exercise routes presented on the map. The route selection button may be displayed on a touch display of an apparatus for recommending an exercise route. In response to the user's clicking on one route recommendation request button, it may be determined that the user has not chosen any exercise routes.

In response to a determination that the user has not chosen any routes yet (NO in operation 1211), the flow may proceed back to operation 1207 to select another route recommendation, and operation 1209 may be repeated in which the selected one or more route recommendations are presented on the map.

In response to a determination that the use has chosen a route (YES in 1211), data about the selected exercise route may be stored as user preference information in 1213. The user preference information may be used as a criterion for selecting future route recommendations in 1207.

Figure 13:
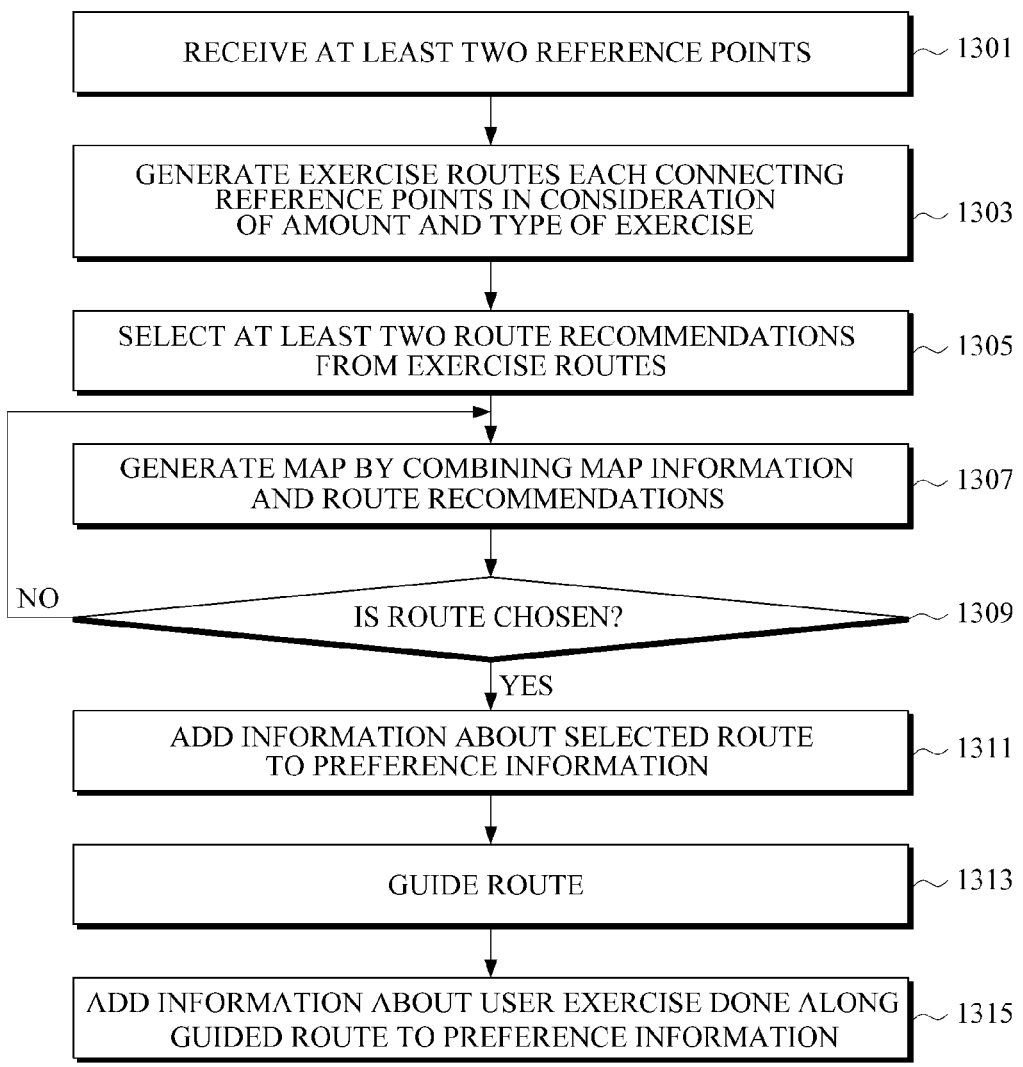
FIG. 13 is a flowchart illustrating another example of a method of recommending an exercise route.

FIG. 13 is a flowchart illustrating another example of an exercise route recommendation method.

FIG. 13 illustrates an example of an exercise route recommendation method 1300 in which a plurality of exercise routes are selected and recommended for a user to choose and route guidance is provided for an exercise route chosen by the user.

In 1301, at least two reference points are received. In response to receiving the reference points, a plurality of exercise routes, each connecting the reference points, may be generated based on exercise information and map information in 1303. In response to generation of the exercise routes, at least two route recommendations may be selected from the generated exercise routes according to predetermined selection criteria in 1305. The selection criteria may be determined by user preference information.

In response to selection of the route recommendations, a map with a map area which includes an origin and a destination and has the exercise routes presented thereon may be generated in 1307. Then, in 1309, it may be determined whether or not the user has chosen one exercise route from the map, which includes the exercise routes, and is presented on a display.

In 1309, for example, a route selection button and a route recommendation request button may be provided for each exercise route. In response to the user's clicking on one route selection button, it may be determined that an exercise route corresponding to the clicked route selection button is selected among the plurality of exercise routes presented on the map. In response to the user's clicking on a route recommendation request button, it may be determined that the user has not chosen any routes.

In response to a determination that the user has not chosen any routes (NO in 1307), the flow proceeds back to operation 1305 to select another route recommendation and operation 1307 is repeated in which the selected route recommendation is presented on the map.

In response to a determination that the user has chosen an exercise route (YES in operation 1309), data regarding the selected exercise route may be stored as user preference information in 1311. The user preference information may be used as a criterion for selecting future route recommendations in operation 1305. Then, the route guidance for the selected exercise route may be provided in 1313. Finally, information about the user's actual exercise may be stored as user preference information in 1315.

The components of the exercise route recommendation apparatus described above may be implemented by hardware that includes circuits to execute particular functions. Alternatively, the components of the apparatus described herein may be implemented by the combination of hardware, firmware and software components of a computing device. A computing device may include a processor, a memory, a user input device, and/or a presentation device. A memory may be a non-transitory computer readable medium that stores computer-executable software, applications, program modules, routines, instructions, and/or data, which are coded to perform a particular task in response to being executed by a processor. The processor may read and execute or perform computer-executable software, applications, program modules, routines, instructions, and/or data, which are stored in the memory. The user input device may be a device capable of enabling a user to input an instruction to cause a processor to perform a particular task or to input data required to perform a particular task. The user input device may include a physical or virtual keyboard, a keypad, a mouse, a joystick, a trackball, a touch-sensitive input device, microphone, etc. The presentation device may include a display, a printer, a speaker, a vibration device, etc.

In addition, steps, procedures, and processes of the method for recommending exercise routes described herein may be implemented using hardware that includes a circuit to execute a particular function. Alternatively, the method for recommending exercise routes may be implemented by being coded into computer-executable instructions to be executed by a processor of a computing device. The computer-executable instruction may include software, applications, modules, procedures, plugins, programs, instructions, and/or data structures. The computer-executable instructions may be included in computer-readable media. The computer-readable media may include computer-readable storage media and computer-readable communication media. The computer-readable storage media may include as read-only memory (ROM), random access memory (RAM), flash memory, optical disk, magnetic disk, magnetic tape, hard disk, solid state disk, etc. The computer-readable communication media may refer to signals capable of being transmitted and received through a communication network that are obtained by coding computer-executable instructions having a speech emotion recognition method coded thereto.

The computing device may include various devices, such as wearable computing devices, hand-held computing devices, smartphones, tablet computers, laptop computers, desktop computers, personal computers, servers, and the like. The computing device may be a stand-alone type device. The computing device may include multiple computing devices that cooperate through a communication network. The computing device may be a mobile device.

As a non-exhaustive illustration only, a mobile device may refer to a computer device that may be carried. Examples of a mobile device include a cellular phone, a smart phone, a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, a wearable computing device such as a smart ring, a smart watch, smart glasses, a smart bracelet, a helmet, a device embedded in the cloths or the like. A mobile device may include a display, a touch display, a keypad, a processor, a microphone and the like.

The apparatus described with reference to FIGS. 1 to 8 is only exemplary. It will be apparent to one of ordinary skill in the art that various other combinations and modifications may be possible without departing from the spirit and scope of the claims and their equivalent. The components of the apparatus may be implemented using hardware that includes circuits to implement individual functions. In addition, the components may be implemented by the combination of computer-executable software, firmware, and hardware, which is enabled to perform particular tasks in response to being executed by a processor of the computing device.

The method for recommending exercise routes described above with reference to FIGS. 9 to 13 is only exemplary. It will be apparent to one skilled in the art that various other combinations of methods may be possible without departing from the spirit and scope of the claims and their equivalent. Examples of the exercise route recommendation method may be coded into computer-executable instructions that cause a processor of a computing device to perform a particular task. The computer-executable instructions may be coded using a programming language, such as Basic, FORTRAN, C, C++, etc. by a software developer and then compiled into a machine language.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for recommending an exercise route to a user comprising:
   a sensor configured to detect sensing information comprising movements of the user; and
   a processor configured to
      receive at least two reference points that are displayable on a map based on map information;
      generate at least one geographical route between the reference points based on the map information, and generate a plurality of exercise routes by associating at least one type of exercise with the at least one geographical route with reference to exercise information comprising exercise amount data, exercise type data, and health care data of the user,
   wherein the exercise information is generated based on an expected amount of calories expended that is calculated from the sensing information,
   wherein the health care data comprises any one or any combination of any two or more of a target weight to lose, a duration of diet, a total amount of exercise to be done while the user is on the diet, and a recommended daily amount of exercise; and
      generate a map on which the plurality of exercise routes are presented together with a current amount of calories already expended by the user during a day, types of exercise associated with the respective exercise routes, and expected amounts of calories expended on the respective exercise routes, and
   a display configured to display the generated map, and an input device configured to receive a selected route among the plurality of exercise routes from the user,
   wherein the processor is further configured to
      receive a selection of a plurality of types of exercise from the user, and
      generate an exercise route divided into a first portion associated with a first type of exercise of the plurality of types of exercise, and a second portion associated with a second type of exercise of the plurality of types of exercise.

2. The apparatus of claim 1, wherein the exercise information is further generated based on information manually input by the user.

3. The apparatus of claim 1, wherein the exercise type data comprises at least one of the following activities: being inactive, walking, running, and user-powered transport; the being inactive corresponds to not moving or moving by transportation equipment powered by a source other than a user's physical strength; the walking and running correspond to an activity of moving by foot; and the user-powered transport corresponds to an activity of moving by a transportation powered by a user's physical strength.

4. The apparatus of claim 1, wherein the processor is further configured to generate the plurality of exercise routes to be different from one another in at least one of their associated types of exercise or their geographical routes.

5. The apparatus of claim 1, wherein the processor is further configured to select at least two exercise routes from the generated plurality of exercise routes according to predefined selection criteria, and transmit the selected exercise routes for use in the map generation.

6. The apparatus of claim 5, wherein the selection criteria comprise preference information about a type of exercise preferred by the user.

7. The apparatus of claim 6, wherein the preference information is obtained from information about a preferred type of exercise that has been chosen by the user from previously recommended exercise routes.

8. The apparatus of claim 6, wherein the preference information is obtained from sensing data obtained from detecting a movement of the user.

9. The apparatus of claim 1, wherein the processor is further configured to determine the expected amounts of calories expended for the respective routes.

10. The apparatus of claim 1, wherein the at least one type of exercise comprises at least two types of exercise corresponding to at least one of the at least one geographical routes.

11. The apparatus of claim 1, wherein the at least one type of exercise is selected from exercises that include inactive and active types.

12. A method of recommending exercise routes to a user, comprising:
- detecting, by a sensor, sensing information comprising movements of the user;
- obtaining exercise information comprising exercise amount data, exercise type data, and health care data of the user, the health care data comprising any one or any combination of any two or more of a target weight to lose, a duration of diet, a total amount of exercise to be done while the user is on the diet, and a recommended daily amount of exercise,
- wherein the exercise information is generated based on an expected amount of calories expended that is calculated from the sensing information;
- receiving at least two reference points that are displayable on a map based on map information;
- generating at least one geographical route between the reference points based on the map information and generating a plurality of exercise routes by associating at least one type of exercise with the at least one geographical route with reference to the exercise information;
- generating a map on which the plurality of exercise routes are presented together with a current amount of calories already expended by the user during a day, types of exercise associated with the respective exercise routes, and expected amounts of calories to be expended on the respective exercise routes;
- receiving a selection of a plurality of types of exercise from the user; and
- generating an exercise route divided into a first portion associated with a first type of exercise of the plurality of types of exercise, and a second portion associated with a second type of exercise of the plurality of types of exercise.

13. The method of claim 12, wherein the exercise information is further generated based on information manually input by the user.

14. The method of claim 12, wherein the exercise type data comprises at least one of the following activities: being inactive, walking, running, and user-powered transport; the being inactive corresponds to not moving or moving by transportation equipment powered by a source other than a user's physical strength; the walking and running correspond to an activity of moving by foot; and the user-powered transport corresponds to an activity of moving by a transportation powered by a user's physical strength.

15. The method of claim 12, wherein the generating of the plurality of exercise routes comprises generating the plurality of exercise routes to be different from one another in at least one of their associated types of exercise or their geographical routes.

16. The method of claim 12, further comprising:
- selecting at least two exercise routes from the generated plurality of exercise routes according to predefined selection criteria, and transmitting the selected exercise routes for the generating of the map.

17. The method of claim 16, wherein the selection criteria comprise preference information about a type of exercise preferred by the user.

18. The method of claim 17, wherein the preference information is obtained from information about a preferred type of exercise that has been chosen by the user from previously recommended exercise routes.

19. The method of claim 17, wherein the preference information is obtained from sensing data obtained from detecting a movement of the user.

20. A method for recommending an exercise route to a user, comprising:
- detecting, by a sensor, sensing information comprising movements of the user;
- receiving at least two reference points corresponding to geographic locations through an input unit of a mobile device;
- causing a processor of the mobile device to generate a plurality of exercise routes between the reference points by associating at least one type of exercise with geographical routes between the at least two reference points based on exercise information;
- causing a display of the mobile device to display a map on which the plurality of exercise routes are displayed with a current amount of calories already expended by the user during a day, types of exercise associated with the respective exercise routes, and exercise information comprising any one or any combination of any two or more of expected amounts of calories to be expended on the respective exercise routes, expected difficulty level of the respective exercise routes, and expected energy level to be expended on the respective exercise routes,
- wherein the exercise information comprises at least one of exercise amount data, exercise type data, and health care data, the health care data comprising any one or any combination of any two or more of a target weight to lose, a duration of diet, a total amount of exercise to be done while the user is on the diet, and a recommended daily amount of exercise,
- wherein the exercise information is generated based on an expected amount of calories expended that is calculated from the sensing information;
- receiving a selection of a plurality of types of exercise from the user; and
- causing a processor of the mobile device to generate an exercise route divided into a first portion associated with a first type of exercise of the plurality of types of exercise, and a second portion associated with a second type of exercise of the plurality of types of exercise.

21. The method of claim 20, further comprising receiving one route among the plurality of exercise routes as a user choice via the display, the display of the mobile device being a touch display.

22. A non-transitory computer medium storing computer readable instructions that, when executed by a processor of a mobile device, cause a mobile device to perform the method of claim 20.

* * * * *